(12) United States Patent
Soerensen

(10) Patent No.: US 11,008,722 B2
(45) Date of Patent: May 18, 2021

(54) CABLE HANG-OFF ARRANGEMENT

(71) Applicant: Siemens Gamesa Renewable Energy A/S, Brande (DK)

(72) Inventor: Johnny Soerensen, Videbæk (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/491,172

(22) PCT Filed: Nov. 29, 2017

(86) PCT No.: PCT/EP2017/080740
§ 371 (c)(1),
(2) Date: Sep. 5, 2019

(87) PCT Pub. No.: WO2018/162104
PCT Pub. Date: Sep. 13, 2018

(65) Prior Publication Data
US 2020/0032474 A1   Jan. 30, 2020

(30) Foreign Application Priority Data
Mar. 9, 2017 (DE) .................... 10 2017 203 895.0

(51) Int. Cl.
*H02G 1/08* (2006.01)
*H02G 1/10* (2006.01)
(Continued)

(52) U.S. Cl.
CPC ............ *E02B 17/027* (2013.01); *H02G 1/08* (2013.01); *H02G 1/10* (2013.01); *H02G 9/02* (2013.01);
(Continued)

(58) Field of Classification Search
CPC ..... E02B 2017/0095; H02G 9/00; H02G 9/06
See application file for complete search history.

(56) References Cited

U.S. PATENT DOCUMENTS 3,376,708 A    4/1968  Hindman
3,670,513 A *  6/1972  Matthews, Jr. ........... F16L 1/26
                                                        405/169
(Continued)

FOREIGN PATENT DOCUMENTS

DE         10222646 A1 *  1/2004  ............. F03D 13/22
DE      102008028476 A1   12/2009
(Continued)

OTHER PUBLICATIONS

International Search Report dated Mar. 19, 2018 for Application No. PCT/EP2017/080740.

*Primary Examiner* — Frederick L Lagman
(74) *Attorney, Agent, or Firm* — Schmeiser, Olsen & Watts LLP

(57) ABSTRACT

Provided is a cable hang-off arrangement of an elevated platform including a number of tubular enclosures, wherein a tubular enclosure is configured to accommodate a transmission cable arrangement and includes a vertical section arranged for connection to a supporting structure of the elevated platform; a horizontal section arranged at the level of the elevated platform; and a curved section between the vertical section and the horizontal section. Also provided is a tubular enclosure of such a cable hang-off arrangement; an offshore facility; and a method of securing a transmission cable arrangement to such an offshore facility.

15 Claims, 4 Drawing Sheets

(51) Int. Cl.
    *E02B 17/00* (2006.01)
    *E02B 17/02* (2006.01)
    *H02G 9/02* (2006.01)
    *H02G 9/06* (2006.01)

(52) U.S. Cl.
    CPC ........ *H02G 9/06* (2013.01); *E02B 2017/0065* (2013.01); *E02B 2017/0069* (2013.01); *E02B 2017/0095* (2013.01)

(56) References Cited

U.S. PATENT DOCUMENTS

| | | | |
|---|---|---|---|
| 2013/0202361 A1* | 8/2013 | Giering | E02B 17/021 405/224 |
| 2014/0037384 A1* | 2/2014 | Moeller | F16L 1/235 405/158 |
| 2017/0077687 A1 | 3/2017 | Soerensen | |
| 2019/0145385 A1* | 5/2019 | Soerensen | H02G 1/10 |

FOREIGN PATENT DOCUMENTS

| | | | | |
|---|---|---|---|---|
| DE | 102008031002 A1 | 12/2009 | | |
| DE | 102014206000 A1 | 10/2015 | | |
| EP | 2586917 A2 | 5/2013 | | |
| EP | 2863053 A1 | 4/2015 | | |
| EP | 3086424 A1 | 10/2016 | | |
| GB | 2369728 A | 6/2002 | | |
| GB | 2473058 A | 3/2011 | | |
| GB | 2473733 A | 3/2011 | | |
| GB | 2473733 A1 | 3/2011 | | |
| JP | 02262814 A * | 10/1990 | ................ | F16L 1/26 |
| WO | 2012144884 A1 | 10/2012 | | |
| WO | WO 2012144884 A1 | 10/2012 | | |
| WO | WO-2014114620 A1 * | 7/2014 | ................ | F16L 1/26 |
| WO | 2018046205 A1 | 3/2018 | | |
| WO | WO 2018046205 A1 | 3/2018 | | |
| WO | WO-2018162103 A1 * | 9/2018 | ................ | H02G 9/02 |

\* cited by examiner

CABLE HANG-OFF ARRANGEMENT

CROSS-REFERENCE TO RELATED APPLICATIONS

This application claims priority to PCT Application No. PCT/EP2017/080740, having a filing date of Nov. 29, 2017, which is based on German Application No. 10 2017 203 895.0, having a filing date of Mar. 9, 2017, the entire contents both of which are hereby incorporated by reference.

FIELD OF TECHNOLOGY

The following describes a cable hang-off arrangement; a tubular enclosure of a cable hang-off arrangement; an off-shore installation; and a method of securing a transmission cable arrangement of an offshore installation.

BACKGROUND

An offshore installation or offshore facility such as a wind turbine, an electrical sub-station, an oil or gas drilling installation etc., is generally mounted on a support structure and requires a transmission link to an on-shore connection point and/or to another offshore facility. Usually, most of the transmission link between two such facilities rests on the seabed. A transmission link can comprise a number of power cables as well as communication cables arranged in number of tubes or hoses. These are usually armored to protect against damage since the transmission link may lie exposed on the seabed or may only be buried to a shallow depth. Cables of the transmission link must descend from the level of the elevated platform (carrying the offshore facility) to the level of the seabed. To this end, the transmission cables are usually suspended from the elevated platform and descend essentially vertically to the level of the seabed. It is essential to prevent damage to the cables of the transmission link. Some protection can be given by the use of armored pipes or hoses that contain the cables. Armoring can be realized as a metal mesh or weave embedded in the body of a protective pipe or tube. The weight of the armored pipes and their cumbersome handling require significant effort when mounting or connecting them at the level of an elevated platform. Such armored pipes are generally heavy and very inflexible. Furthermore, when such a heavy pipe or hose rest on a sharp edge at any point along its length, its weight may result in denting or cracking of the armored pipe.

SUMMARY

An aspect relates to an improved way of supporting transmission cable arrangements of an offshore facility.

According to embodiments of the invention, the cable hang-off arrangement is for used in conjunction with an installation that has an elevated platform. An example of such an installation is an offshore wind turbine installation, an offshore electrical sub-station, an offshore oil or gas drilling installation, etc. The elevated platform may also be referred to as a transition piece, since it acts as a transition between a supporting structure (monopile, jacket structure, etc.) and the remainder of the installation. The inventive cable hang-off arrangement comprises a number of tubular enclosures, wherein a tubular enclosure is realized to accommodate a transmission cable arrangement and comprises a vertical section arranged for connection to a supporting structure of the elevated platform; a horizontal section arranged to guide the transmission cable arrangement into the elevated platform; and a curved section between the vertical section and the horizontal section. Each tubular enclosure acts as a protective body for a transmission cable arrangement from a level at or above the elevated support to a level at or near the base of the supporting structure. Since it includes a horizontal section in addition to the vertical section, a tubular enclosure can lead its transmission cable arrangement out beyond an edge of the elevated support before descending towards the base of the supporting structure.

According to embodiments of the invention, an offshore facility comprises an elevated platform arranged on a supporting structure; and an embodiment of the inventive cable hang-off arrangement, realized to accommodate at least one transmission cable arrangement for electrically connecting the facility to at least one further facility. A further facility can be any another offshore facility as explained above.

According to embodiments of the invention, the method of securing a transmission cable arrangement of such an offshore installation using such a cable hang-off arrangement comprises the steps of providing a number of transmission cable arrangements for electrically connecting the offshore facility to at least one further facility; and arranging each transmission cable arrangement in a tubular enclosure of the cable hang-off arrangement.

An advantage of the inventive cable hang-off arrangement is that any transmission cable arrangement can be supported over its length within a tubular enclosure in such a way that small-radius bending of the transmission cable arrangement is avoided. This allows the power cables to be realized as more economical non-armored versions that would generally be used in on-shore installations. In addition to being cheaper, the non-armored versions are more flexible and significantly lighter than the armored versions.

The transmission cable arrangement is therefore well protected against damage such as denting or cracking. A further advantage is that a transmission cable arrangement is not exposed to the environment since it is completely enclosed within sections of a tubular enclosure. Also, a transmission cable arrangement will not rest on a sharp edge at any point along its length between a level at the elevated support and a level near the base of the supporting structure.

Particularly advantageous embodiments and features of the invention are given by the dependent claims, as revealed in the following description. Features of different claim categories may be combined as appropriate to give further embodiments not described herein.

In the following, without restricting embodiments of the invention in any way, it may be assumed that the elevated platform is the transition piece of an offshore facility such as a wind turbine. In the case of an offshore wind turbine, the elevated platform or transition piece may also be referred to as a tower foundation platform. The elevated platform can rest on a support structure such as a jacket structure, a monopile, a gravity foundation or even a floating structure.

In the following, the terms "transmission cable arrangement", "transmission link" and "sea cable" may be regarded as synonyms and may be used interchangeably.

In the inventive cable hang-off arrangement, several tubular enclosures may be deployed. For example, one tubular enclosure can be used for a transmission cable arrangement from a wind turbine installation to an onshore or offshore substation, and one or more further tubular enclosures can be used for sea cables to two further wind turbine installations. Sea cables pass from the level of the seabed via a vertical portion (given by one or more vertical sections of tubular enclosures) to the level of the elevated platform, where the horizontal sections may be secured to the platform support structure. A tubular enclosure comprises three parts or sections: the vertical section, the bent or curved section, and the horizontal section. The curved section in conjunction with the vertical section or the horizontal section may be regarded as a type of "J-tube" which serves to ensure that the transition cables are given a favorably large bending radius for the transition between horizontal and vertical. Preferably, the curved section subtends an arc of at least 90° to ensure a smooth transition from the horizontal to the vertical.

The three sections of a tubular enclosure can be made from a single pipe or tube, for example a steel tube. Alternatively, the tubular enclosure can be realized in two or three sections which can be provided separately. Preferably, the sections have the same diameter. To accommodate a transmission cable arrangement of an offshore wind turbine, for example, the diameter of a tubular enclosure preferably lies in the range 200 mm-800 mm. The diameter of a tubular enclosure will depend on the size and type of the transmission cable arrangement that it will enclose.

The sections of a tubular enclosure can be connected to one another in any suitable way. For example, one end of a curved steel tube section can be provided with an end flange for connection to a similar flange at the end of a horizontal steel tube section, etc.

The most vulnerable part of the cable hang-off arrangement may be its vertical portion, since this is likely to be exposed to hazards such as collision damage from debris carried on the water, or inadvertent collisions with marine vessels. A vertical portion of the inventive cable hang-off arrangement is therefore given additional stability, for example by forming the vertical sections of the tubular enclosures from thicker material. Alternatively, or in addition, in preferred embodiments of the invention, the cable hang-off arrangement comprises a single vertical section realized to accommodate the transmission cable arrangements of a plurality of tubular enclosures. In this embodiment, the single vertical section can have a favorably large diameter, and acts as a protective barrel. Alternatively, or in addition, it may comprise a double wall construction. The protective barrel or outer pipe section can be used instead of the vertical section(s) of the tubular enclosures, or can be arranged to at least partially enclose such vertical section(s). This protective barrel or outer pipe section can provide additional protection against wave damage, against debris carried on the water, and against inadvertent collision with a marine vessel. With these measures, even if some object should collide with the vertical section, any dent or damage will be limited to the vertical section itself, while the transmission cable arrangements remain undamaged.

In preferred embodiments of the invention, the inventive cable hang-off arrangement comprises an inverted conical structure or "ice cone" arranged to partially enclose a vertical portion of the cable hang-off arrangement. The "ice cone" serves to prevent damage caused by ice forming on the water.

The inventive cable hang-off arrangement serves as an interface between the installation or facility and the rest of the transmission link on the seabed. Usually, there will be some distance between the bottom of the vertical portion of the cable hang-off arrangement and the seabed. Therefore, in preferred embodiments of the invention, the inventive cable hang-off arrangement comprises an end connector realized for mounting to the base of the vertical portion. An end connector can be formed to make a smooth transition between the vertical section of the tubular enclosure and a sea cable on the seabed. Such an end connector can be mounted onto the vertical portion using flanges, as explained above, and is preferably oriented in the direction of the see cable to which it attaches.

BRIEF DESCRIPTION

Some of the embodiments will be described in detail, with references to the following Figures, wherein like designations denote like members, wherein.

DETAILED DESCRIPTION

Figure 1:
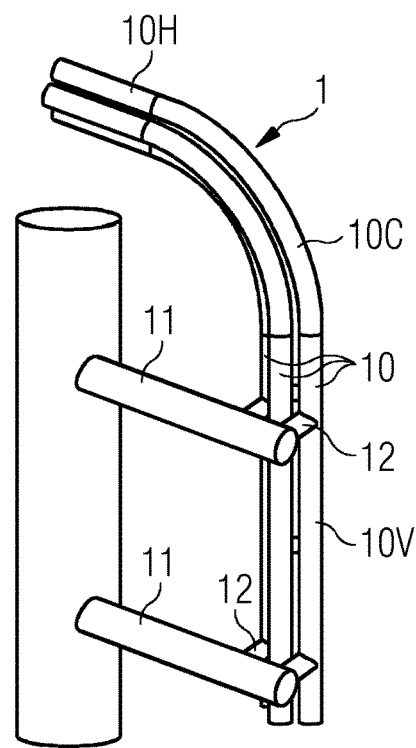
FIG. 1 shows an embodiment of a cable hang-off arrangement.

FIG. 1 shows an embodiment of the inventive cable hang-off arrangement 1, realized for attachment to a supporting structure of an elevated (offshore) platform such as an offshore WT transition piece. In this exemplary embodiment, the cable hang-off arrangement 1 comprises three tubular enclosures 10. This cable hang-off arrangement 1 can therefore accommodate up to three transmission cable arrangements. Each tubular enclosure 10 comprises a vertical section 10V arranged for connection to a leg (indicated in the diagram) of supporting structure of the elevated platform. To mount the vertical sections 10V of the tubular enclosures 10 to the supporting structure, a suitable arrangement of spars 11, 12 can be used, as indicated in the diagram. In this embodiment, longer spars 11 are welded or bolted to a leg of the supporting structure. A number of shorter spars 12 are used to secure the vertical sections 10V to the longer spars 11.

Each tubular enclosure 10 further comprises a horizontal section 10H arranged to guide a transmission cable arrangement into the elevated platform. To connect each horizontal section 10H with its corresponding vertical section 10V, each tubular enclosure 10 further comprises a curved section 10C that is shaped to form a smooth transition between the horizontal and the vertical. The diagram shows that this exemplary embodiment uses curved sections 10C that each subtend an arc of about 90° between a horizontal section 10H and a vertical section 10V. The sections 10H, 10C, 10V of each tubular enclosure 10 can be connected in any suitable way, for example by means of flanges.

Figure 2:
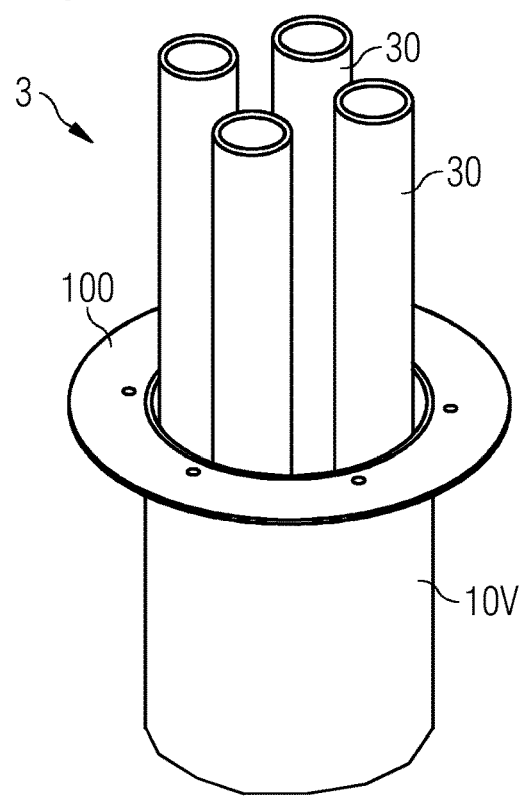
FIG. 2 shows a vertical section of an embodiment of a tubular enclosure.

FIG. 2 indicates such an outer flange 100 at the top of a vertical section 10V of a tubular enclosure 10. This outer flange 100 can be secured to corresponding flange at the lower end of a curved section 10C using appropriate fasteners. The diagram also shows pipes 30 of a transmission cable arrangement 3. These can be hollow flexible plastic tubes 30, for example high-density polyethylene (HDPE) tubes, into which the electrical cables are later installed. For example, a transmission cable arrangement 3 can comprise three such hollow tubes 30, each of these can later carry a power cable.

All power generated by a wind turbine is transmitted through its power cable or export cable along the transmission link. At times of high production, the export cables will become hot. The parts of the transmission link that are located in water will be kept favorably cool by the surrounding water temperature, which has generally only a few degrees Celsius. However, at an end position of the power cable e.g. where it is attached to an installation above sea-level, the power cable may not be cooled sufficiently. Such overheated parts of a power cable are referred to as "hot spots" and may cause damage to the cable. An advantage of using a hollow tube is that it can be designed to contain water in addition to a power cable. The water is an efficient cooling medium and keeps the temperature of the power cable at an acceptable level. A cooler power cable can carry a higher electric current. The tube 30 can be partially or completely filled with water during or after installing the power cable. The liquid cooling is particularly advantageous at the cable end connections.

The transmission cable arrangement 3 can also include communication cables (not shown), and/or one or more additional hollow tubes 30, for example an empty tube that can be used during a maintenance procedure. Of course, a transmission cable arrangement 3 can be realized differently, for example as a single flexible hollow pipe or hose which will contain all power cables along with any other communications cables such as fibre-optic or co-axial cables.

Figure 3:
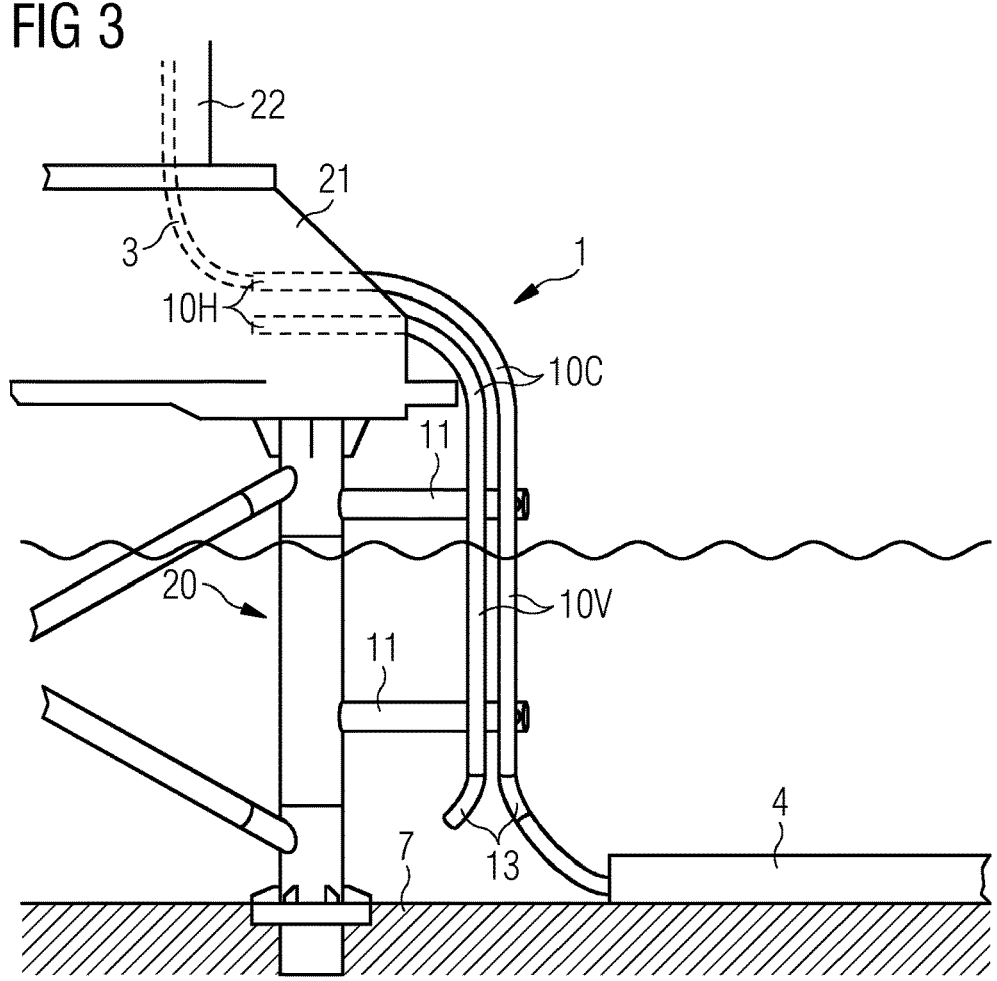
FIG. 3 illustrates an embodiment of a wind turbine installation.

FIG. 3 illustrates an embodiment of an inventive wind turbine installation 2. An elevated platform 21 is arranged on a supporting structure 20 for a wind turbine tower 22. The supporting structure 20 in this case is a jacket structure in place on the seabed 7. To electrically connect a wind turbine to a further installation such as a sub-station or another wind turbines, an embodiment of the inventive cable hang-off arrangement 1 is provided, which has tubular enclosures 10 for carrying a number of transmission cable arrangements 3. Two tubular enclosures 10 are shown in this example, one for the export cable 3 and one for connection to a neighboring wind turbine. An exemplary transmission cable arrangement 3 (which may comprise one or more data cables in addition to three power cables, for example) is indicated in the diagram, showing how it is contained in a tubular enclosure 10 in such a way that it is physically supported over its entire length from the transition piece 21 to a sea cable arrangement 4 on the seabed 7. The transmission cable arrangement 3 is therefore protected from physical damage. A transmission cable arrangement 3 may also be designed to allow a cooling medium such as water to be filled into the hollow tube(s). In the inventive cable hang-off arrangement 1, the cooling medium can be contained in the hollow tubes 30 all the way up to the level of the curved section 10C, or even into the region of the horizontal section 10H, if the hollow pipes can be sealed to prevent leaks. One or more types of cooling medium may be pumped into a hollow pipe before or after the power cables are installed. Water cooling is effective at reducing or preventing high temperatures at the hot-spot regions of a transmission cable arrangement. At the upper or outer end of the cable hang-off arrangement, a suitable seal at the end face of the tubular enclosure ensures that any such medium is satisfactorily contained.

Figure 4:
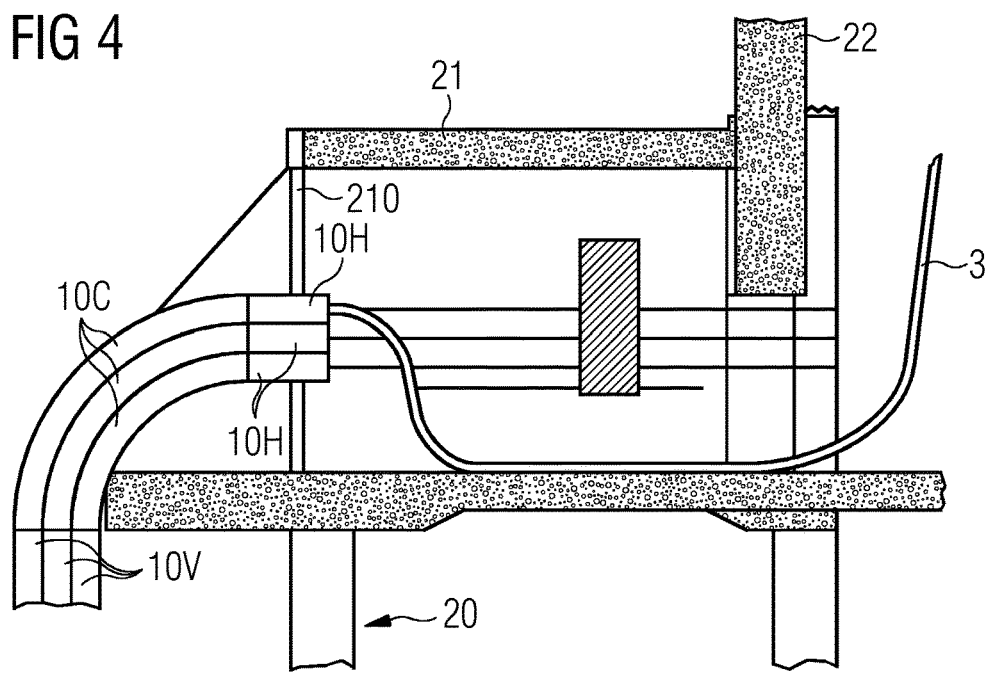
FIG. 4 shows a detail at an upper end of an embodiment of the cable hang-off arrangement.

FIG. 4 shows a detail at the upper end of a cable hang-off arrangement 1 for an embodiment of the inventive wind turbine installation 2, and indicates how the horizontal sections 10H of three tubular enclosures may be arranged in or on the elevated support 21. Here, the ends of the horizontal sections 10H are arranged in a suitable opening in a side wall 210 of the transition piece 21, and can be secured to the side wall 210 by means of flanges, for example, or by any other suitable mounting means. The diagram also shows an export cable 3 in relation to its tubular enclosure 10. This might be an export cable for electrical connection between the wind turbine generator and a substation of a wind farm.

Figure 5:
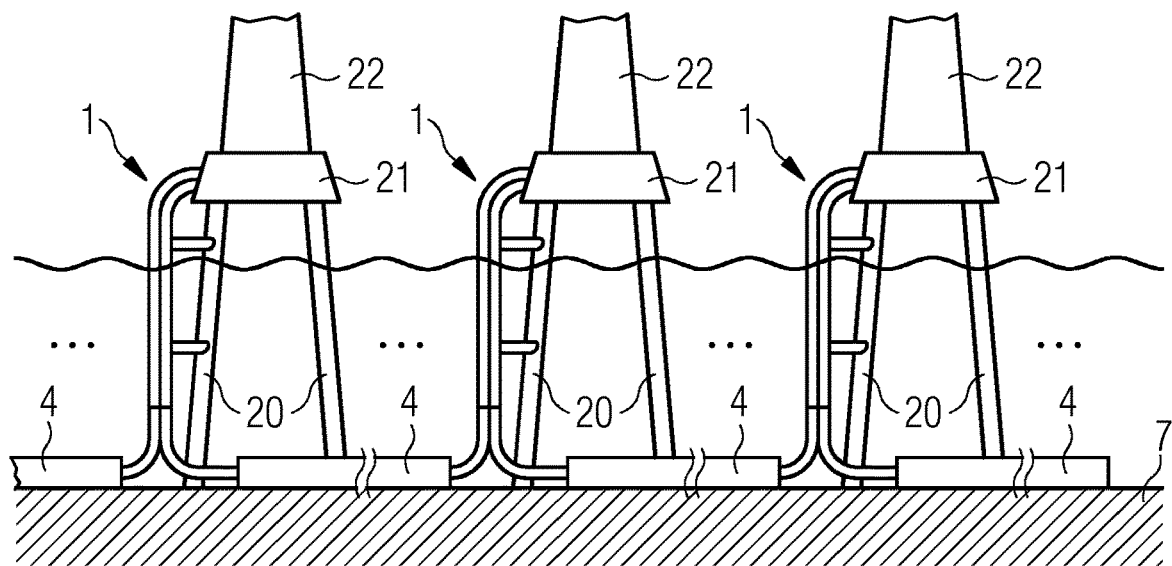
FIG. 5 shows an array of wind turbines connected using embodiments of the cable hang-off arrangement.

The previous diagrams have indicated that three tubular enclosures may be provided. In such an embodiment, one tubular enclosure can be used for an export cable (for connecting the wind turbine to the grid), and two tubular enclosures can be used for cable connections to neighboring wind turbines of a wind farm. FIG. 5 illustrates a possible scenario in which an array of wind turbines 2 is connected as a wind farm. The diagram only shows a few wind turbines 2 in one row of an array, but of course any size array is possible. The number of tubular enclosures required will depend on how a particular wind turbine 2 is to be connected. Any wind turbine that has two neighbors will be equipped with a cable hang-off arrangement 1 that has three tubular enclosures. Any wind turbine at an outer end of the array may only need a cable hang-off arrangement 1 with two tubular enclosures, for example, one for the export cable and one for connection to its single neighboring wind turbine. Of course, a stand-alone wind turbine that is not part of an array or a wind farm would only need one tubular enclosure for its export cable. The subsea links 4 between facilities 2 can be laid on the seabed 7 or buried under the seabed 7. In one approach, empty flexible tubes are first laid on the seabed, and the transmission cables are then pushed or pulled through.

Figure 6:
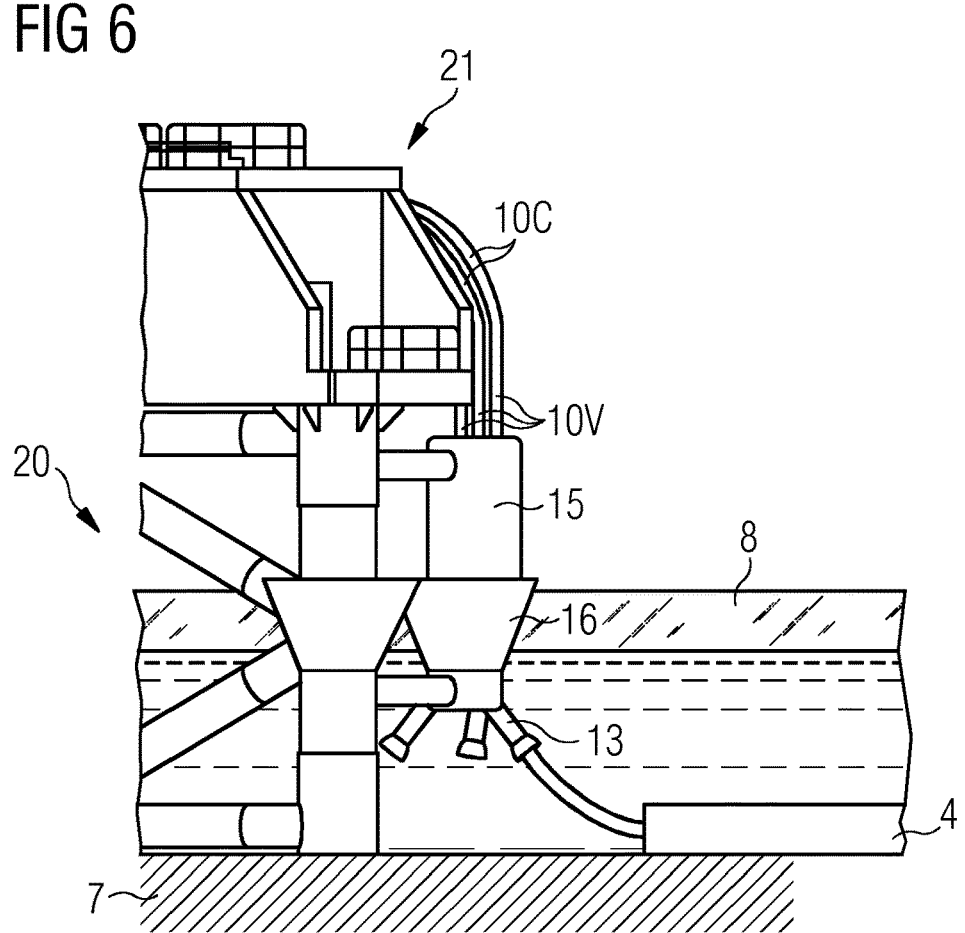
FIG. 6 shows a further embodiment of the cable hang-off arrangement.

FIG. 6 shows a further embodiment of the inventive cable hang-off arrangement 1. Here, the vertical sections 10V of several tubular enclosures 10 are further enclosed by a protective barrel 15 or outer pipe section 15. In this exemplary embodiment, the barrel 15 terminates at an "ice cone" which serves to prevent damage when ice 8 forms on the surface of the water. This diagram also indicates a possible arrangement for end connectors 13, showing that these can diverge in suitable directions, for example one end connector 13 is oriented in the direction of a sub-station, and the other two end connectors 13 are oriented in the directions of two neighboring wind turbines.

Figure 7:
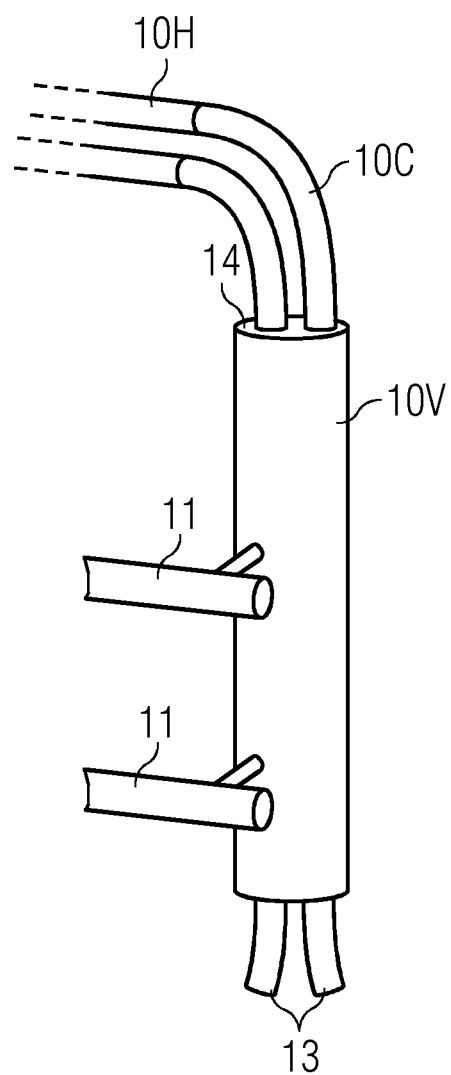
FIG. 7 shows another embodiment of the cable hang-off arrangement.

FIG. 7 shows a further embodiment of the inventive cable hang-off arrangement 1. Here, a single vertical section 10V is used. To connect to one or more curved sections 10C, the single vertical section 10V comprises a suitable "lid" 14 with one or more openings to accommodate the transmission cable arrangements of one or more tubular enclosures 10. Here, two such tubular enclosures 10 are shown. A suitable number of end connectors 13 can be attached to a similar "lid" at the base of the single vertical section 10V to connect to sea pipes laid on the seabed.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The claims are as follows:

1. A cable hang-off arrangement of an elevated platform comprising a plurality of tubular enclosures, wherein a tubular enclosure is configured to accommodate a transmission cable arrangement, the cable hang-off arrangement comprising:

a vertical section arranged for connection to a supporting structure of the elevated platform;

a horizontal section arranged at a level of the elevated platform and configured to guide the transmission cable arrangement into the elevated platform; and a curved section between the vertical section and the horizontal section.

2. The cable hang-off arrangement according to claim 1, wherein the plurality of tubular enclosures is three tubular enclosures.

3. The cable hang-off arrangement according to claim 1, comprising a single vertical section configured to accommodate transmission cable arrangements of the plurality of tubular enclosures.

4. The cable hang-off arrangement according to claim 1, comprising a protective barrel arranged to at least partially enclose the vertical section of the cable hang-off arrangement.

5. The cable hang-off arrangement according to claim 1, comprising an inverted conical structure at a base of the cable hang-off arrangement.

6. The cable hang-off arrangement according to claim 1, comprising an end connector configured for mounting to the base of a vertical section of the tubular enclosure.

7. The cable hang-off arrangement according to claim 6, wherein an end connector is oriented in a direction of a sea cable arrangement.

8. The cable hang-off arrangement according to claim 1, comprising a mounting means for mounting a horizontal section of the tubular enclosure at the level of the elevated platform.

9. The cable hang-off arrangement of claim 1, wherein the horizontal section is configured to guide the transmission cable arrangement into the elevated platform through an opening in a side wall of a transition piece of the elevated platform.

10. An offshore facility comprising:
an elevated platform arranged on a supporting structure; and
a cable hang-off arrangement according to claim 1, configured to accommodate at least one transmission cable arrangement for electrically connecting the offshore facility to at least one further facility.

11. A method of securing a transmission cable arrangement of an offshore facility according to claim 10 using a cable hang-off arrangement, the method comprising:
providing a number of transmission cable arrangements for electrically connecting the offshore facility to at least one further facility; and
arranging each transmission cable arrangement in a tubular enclosure of the cable hang-off arrangement.

12. A tubular enclosure of a cable hang-off arrangement of an elevated platform, the tubular enclosure being configured to accommodate a transmission cable arrangement and the cable hang-off arrangement comprising:
a vertical section arranged for connection to a support of the elevated platform;
a horizontal section arranged at a level of the elevated platform and configured to guide the transmission cable arrangement into the elevated platform; and
a curved section between the vertical section and the horizontal section.

13. The tubular enclosure according to claim 12, wherein the horizontal section, the vertical section and the curved section have a same diameter.

14. The tubular enclosure according to claim 12, wherein the tubular enclosure is dimensioned to enclose a plurality of pipes of the transmission cable arrangement.

15. The tubular enclosure according to claim 12, wherein the curved section subtends an arc of at least 90° between the vertical section and the horizontal section.

* * * * *